United States Patent [19]

Bramhall

[11] Patent Number: 4,825,447
[45] Date of Patent: Apr. 25, 1989

[54] LIPOSOMAL THERMOGRAPH AND METHODS FOR MAKING AND USING SAME

[76] Inventor: John S. Bramhall, 2805 Maple Ave., Manhatten Beach, Calif. 90266

[21] Appl. No.: 99,115
[22] Filed: Sep. 21, 1987
[51] Int. Cl.⁴ .............................................. G01K 11/00
[52] U.S. Cl. ..................................... 374/159; 264/4.1; 374/162; 424/450
[58] Field of Search .............. 374/161, 160, 162, 159; 264/4.1, 4.3, 4.6; 422/68; 424/450

[56] References Cited

U.S. PATENT DOCUMENTS

| | | | |
|---|---|---|---|
| 3,233,459 | 2/1966 | Gleason et al. | 374/160 |
| 4,729,671 | 3/1988 | Asano | 374/160 |
| 4,743,557 | 5/1988 | Tiru et al. | 374/161 |

Primary Examiner—Roy N. Envall, Jr.
Attorney, Agent, or Firm—Donald G. Lewis

[57] ABSTRACT

A liposomal thermograph is employed to monitor the thermal history of goods in transit or storage. The liposomal thermograph becomes fluorescent if the temperature of the goods exceed an operating range. The liposomal thermograph is bi-directional, i.e. it becomes fluorescent if the temperature transgression either falls below a set value on the lower end of the operating range or if it rises toward the upper end of the operating range. The activation of the liposomal thermograph is abrupt at the lower end of operating range. However, at the upper end of the operating range, the liposomal thermograph displays a ramp effect, i.e. the onset of fluorescence is progressive and depends upon the duration of the transgression and the magnitude. The liposomal thermograph is made from a sachet which is filled with a suspension of liposomes which have been loaded with an amphphilic anionic fluorescent dye, preferably having a sodium counterion. The operating range of the liposomal thermograph is determined at the lower end by the freezing point of the liquid medium in which the liposomes are suspended. At the upper end, the operating range is determined by the transition temperature of the lipid membrane of the liposomes.

14 Claims, 4 Drawing Sheets pK 6.3 pK 4.5

LIPOSOMAL THERMOGRAPH AND METHODS FOR MAKING AND USING SAME

The invention relates to thermographic devices which maintain a thermal record of goods in storage or transit. More particularly, the invention relates to thermographic devices which employ a thermographic composition which irreversibly changes colors when exposed to temperatures outside of a desired temperature range.

BACKGROUND OF THE INVENTION

Thermographs are employed for maintaining a thermal history of temperature sensitive goods. Temperature sensitive goods may include various foods, biochemicals, pharmaceuticals, biologicals, cultures, tissues, organs, and other thermolabile goods. Such goods typically have an optimal storage temperature of approximately 4° C. However, such goods may undergo rapid degradation if they are exposed to temperatures outside of a specified range. For example, such goods may suffer freeze damage if their temperature drops below freezing; on the other hand, such goods may suffer denaturation, microbial attack, undesired enzymic reactions, or other effects at elevated temperatures, e.g. 20° C. or higher.

Carmen G. Boeriu et al. (Bio/Technology, vol. 4, pp. 997-999 (November 1986)) disclose a thermographic composition which may be employed for monitoring frozen goods. Certain frozen goods suffer freeze-thaw damage if they are unintentionally thawed. Damage may occur even if the goods are promptly refrozen after the unintended thaw. Examples of such goods include frozen fish and various biochemicals. In order to monitor or detect the occurrence of an unintended thaw, Boeriu has developed a thermographic composition which undergoes a permanent color change above a specified temperature. The specified temperature may be 0° C. or any other temperature within a wide range of 0° C. The thermographic composition includes a paraffin which undergoes a solid-liquid transition at the specified temperature. An enzyme which drives a color reaction and its substrate are embedded within the solidified paraffin. Below the transition temperature of the solid paraffin, the enzyme and substrate are immobilized and inactive. Above the transition temperature, the enzyme becomes catalytically active and converts the substrate into its corresponding product. Typically the product will have a markedly different color than the substrate. When Boeriu's thermographic composition is stored in thermal contact with froozen goods which require monitoring, the occurrence of an unintended freeze-thaw cycle can be determined by the conversion of substrate to product, as determined by the appearance of the color reaction.

Boeriu's thermographic composition can also be employed for monitoring the thermal history of goods at temperatures other than the freezing temperature. However, Boeriu's thermographic composition can only detect uni-directional thermal transgressions, i.e. positive thermal transgressions which exceed a set temperature. Boeriu's thermographic composition can not monitor negative thermal transgressions, i.e. thermal transgressions which dip below a set temperature.

What is needed is a thermographic composition and device which is bi-directional, i.e. which can monitor both positive and negatitive thermal transgressions. Such a thermographic device would be useful for monitoring a thermal history within a set temperature range. Thermal transgressions which either exceeded or fell below the temperature range would be detected. Such a device would find utility monitoring chilled goods which should be maintained at 4° C., which must not be allowed to freeze and which must not be exposed to elevated temperatures, except possibly for brief periods.

Additionally, it would be useful if the thermographic device provided a sharp transition to indicate thermal transgressions at the lower end of the temperature range, viz. to indicate an unintended freeze-thaw cycle. On the other hand, at the upper end of the temperature range, viz. for elevated temperatures, it would be useful if the thermographic device provided a ramp effect to indicate the magnitude of a thermal transgression. The ramp effect would intensify the color reaction to indicate thermal transgressions of greater duration and intensity.

Freeze damage typically occurs upon solidification and is not exacerbated by further exposure to deeply subfreezing temperatures. Hence, no ramp effect is required or desired on the lower end of the temperature range.

On the other hand, damage which occurs to goods upon exposure to elevated temperatures may increase with the magnitude of the transgression, i.e. damage arising from long exposures may exceed the damage arising from brief exposures and damage arising from exposure to very elevated temperatures may exceed the damage arising from temperatures which only slightly exceed the preferred temperature range. Thermographic compositions which have a ramp effect provide an indication of the duration and elevation of the thermal transgression. The ramp effect allows the thermographic composition to provide an approximate indication of the magnitude of the damage which occured to the goods being monitored. In effect, the ramp effect would provide an approximate integration of the duration and intensity of the thermal transgression.

The invention is a liposomal thermograph which employs a liposomal thermographic composition. A liposomal thermographic composition is a composition which is substantially non-fluorescent when maintained within a characteristic temperature range but which fluoresces brightly after having been exposed to temperatures outside of such characteristic temperature range. A brightly fluorescing liposomal thermograph is a signal that the goods with which the liposomal thermograph has been stored have been exposed to a temperature transgression, i.e. they have been exposed to elevated or depressed temperatures outside a characteristic temperature range. The liposomal thermographic composition includes liposomes which are loaded with a self-quenching fluorescent dye. Liposomes are vesicle structures having an outer lipid membrane and an interior region or lumen which is enclosed and defined by such outer membrane. The fluorescent dye is loaded into the lumen of the liposome. When a temperature transgression occurs, the fluorescent dye escapes from the lumen of the liposome. Upon its escape from the liposome, the fluorescent dye becomes diluted within the external solution and ceases to self-quench, i.e. the dye fluoresces brightly.

The liposomal thermographic composition of the present invention is bi-directional, i.e. it is useful for detecting both positive and negative temperature transgressions. This property is very useful when monitoring the thermal history of biological materials which must maintained in a chilled condition but which must not be allowed to freeze.

DETAILED DESCRIPTION OF THE DRAWINGS

DETAILED DESCRIPTION

Figure 1:
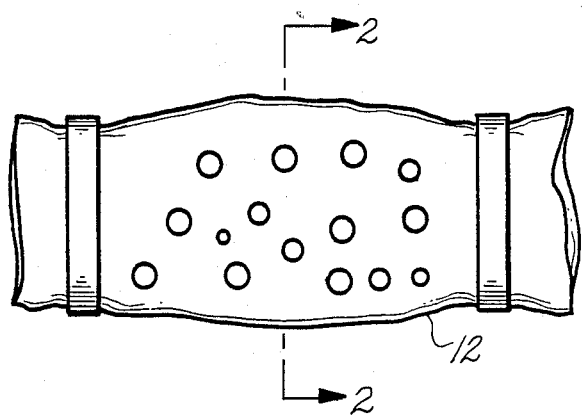
FIG. 1 shows a perspective view of a liposomal thermograph illustrating a sachet.
Figure 2:
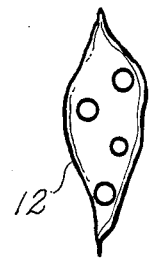
FIG. 2 shows a perspective view of the liposomal thermograph of FIG. 1 illustrating the sachet in a position which has been rotated by 90°.
Figure 3:
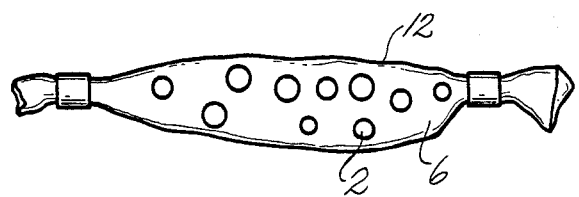
FIG. 3 shows a sectional view of the liposomal thermograph of FIG. 1 illustrating the liposomes and liquid medium. The size of the liposomes is greatly exaggerated for illustrative purposes.
Figure 4:
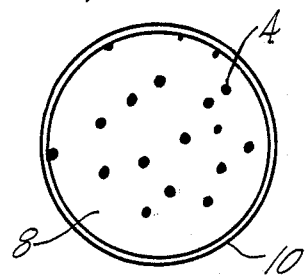
FIG. 4 shows an enlarged sectional view of a liposome from FIG. 3 illustrating the membrane, the lumen, and the fluorescent dye. The size of the fluorescent dye is greatly exaggerated for illustrative purposes.
Figure 5:
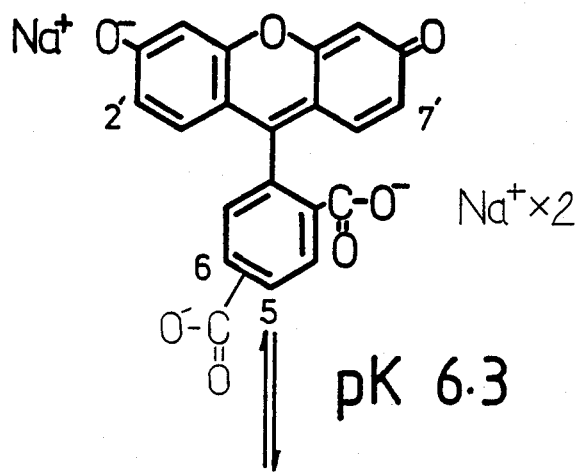
FIG. 5 shows the dissociation states of 5/6-carboxyfluorescein.
Figure 5:
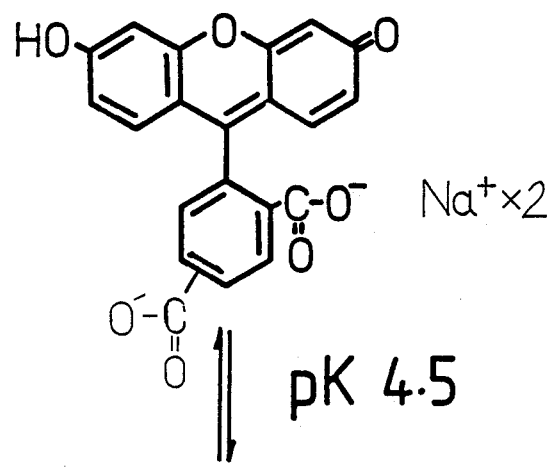
Figure 5:
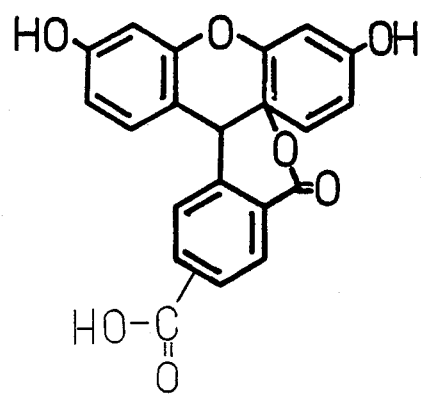

A liposomal thermograph is a thermographic device which employs a liposomal thermographic composition. The liposomal thermographic composition includes liposomes (2) which are loaded with a fluorescent dye (4) and which are suspended in or otherwise contained within a liquid medium (6). In the inactivated state the fluorescent dye (4) is confined to the lumen (8) of the liposomes (2) and is quenched therein either by concentration induced self-quenching or by the introduction of a secondary quencher. The activation of the liposomal thermographic composition causes the fluorescent dye (4) to be released from the liposomes (2) either by permeation through the liposomal membrane (10) or by the lysis of the liposome. Upon release, the fluorescent dye (4) is diluted by the liquid medium (6) and becomes unquenched. Upon exposure to light, the fluorescent dye (4) fluoresces brilliantly. The two mechanisms for the release of the fluorescent dye (4), i.e. lysis and permeation, allow the liposomal thermograph to be bi-directional. Activation is caused by temperature transgressions in opposite directions at either end of an operating temperature range.

Lytic activation of the liposomal thermographic composition may occur by exposing the liposomal thermograph to a freeze-thaw cycle. The freezing point of the liposomal thermographic composition is determined by the freezing point of the liquid medium (6). In the preferred mode, the liquid medium (6) is aqueous buffer. However, the freezing point of the water may be depressed by the addition of an antifreeze. Ethylene glycol, glycerol, and sucrose are examples of antifreezes which may be employed with the liquid medium (6) to depress the freezing point.

Upon activation of the liposomal thermographic composition by exposure to a freeze-thaw transgression, the liposomes (2) lyse and the fluorescent dye (4) is immediately or suddenly released from the lumen (8) of the liposomes (2) into the liquid medium (6). Upon release, the fluorescent dye (4) becomes brilliantly fluorescent.

The liposomal thermographic composition may also be activated by exposure to elevated temperatures. The rate of permeation of the liposomes (2) is a function of temperature and rises quickly at the temperature of the lipid gel-liquid crystalline phase transition of the liposomes (2).

The transition temperature is the temperature at which the lipid phase of the liposome (2) undergoes a gel-liquid crystalline phase transition. The rate of permeation of the fluorescent dye (4) from the liposomes (2) is generally negligible at temperatures less than 20° C. below the transition temperature of the liposomes (2). However, as the temperature increase, the rate of permeation increases exponentially until it reaches a maximum at the transition temperature of the liposomes (2). Hence the amount of released dye (4) will depend upon the duration of a temperature transgression and the closeness of that transgression to the transition temperature. If the temperature is held at the transition temperature, release of the fluorescent dye (4) from the liposomes (2) will be nearly complete within a very short period.

The temperature dependence of the rate of permeation provides a ramp effect. The ramp effect can be used to indicate the severity of a thermal transgression. The severity of a thermal transgression is measured in terms of both temperature elevation and the duration of such temperature elevation. A brief transgression or a transgression having only a mild temperature elevation causes the release of only a low level of fluorescent dye (4) and consequently only a low level of fluorescence. On the other hand, a prolonged transgression and/or a transgression which approaches the transition temperature of the liposome (2) causes a significant release of the fluorescent dye (4) and consequently a high level of fluorescence.

The liposomal thermographic composition of the liposomal thermograph is contained in a sachet (12). In the preferred embodiment, the liposomal thermographic composition is hermetically sealed within the sachet (12). The sachet (12) should be transparent or translucent with respect to excition and emissions of the fluorescent dye (4). In the preferred mode, the composition of the sachet (12) should be nontoxic and should be capable of good thermal contact with the goods which are to be monitored. The sachet (12) may be composed of thin plastic tubing. The tubing may be filled or loaded with the liposomal thermographic composition and sealed at either end by a clamp or by heat sealing. If the tubing is heat sealed, caution should be taken to avoid any thermal contact between the heat source and the liposomal thermographic composition. The tubing should have sufficient length and breadth so as to be readily visible. Once the tubing is loaded and sealed, the liposomal thermograph is stored at a temperature within the operating temperature range, viz. above the freezing point of the liquid medium (6) and at least 20° C. below the transition temperature of the liposomes (2), if possible.

In summary, the liposomal thermograph is bi-directional. When exposed to a freeze-thaw cycle, the release of fluorescent dye (4) is sudden and dramatic. When exposed to increasingly elevated temperatures near the transition temperature, the rate of release of fluorescent dye (4) increases progressively until it reaches a maximum at the transition temperature.

EXAMPLES

In the preferred mode, dipalmitoylphosphatidylcholine (DPPC) liposomes (2) are loaded with 5/6-carboxyfluorescein and suspended in an aqueous buffer to form the liposomal thermographic composition. The liposomal thermographic composition is then loaded into a sachet (12) and hermetically sealed therein. At 4° C., the half-time for release is approximately 6 months. At 20° C., the half-time for release is approximately 5 hours. At 45° C., the half-time for release is approximately 30 minutes. Release of the dye (4) is non-reversible and is indicated by a dramatic increase in sample fluorescence intensity. Sealed liposomes (2) containing 50 millimolar dye (4) can be made in various buffers.

PREPARATION OF THE LIPOSOMES

Figure 7:
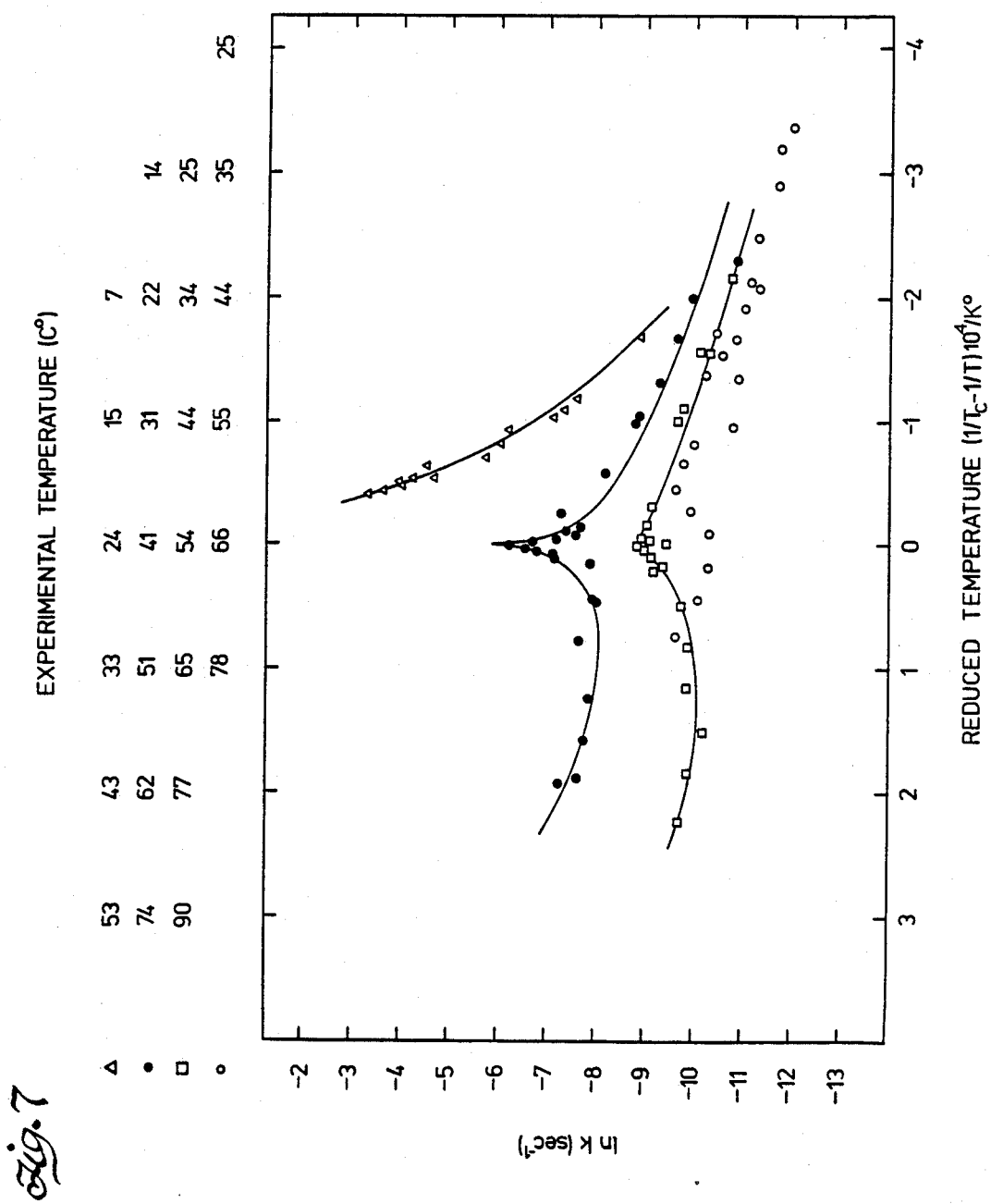
FIG. 7 is a graph showing the profound influence of acyl chain composition upon the rate of sodium permeation.

The transition temperature of the liposomes (2) depends upon its lipid composition. At the transition temperature, the lipid is converted from the solid phase to a liquid phase. As illustrated in FIG. 7, long chain lipids have a higher transition temperature than short chain lipids.

Liposomes (2) may be prepared from a variety of lipids including the following:

1. dimyristoylphosphatidylcholine (DMPC) Tc=24° C.,
2. dipalmitoylphophatidylcholine (DPPC) Tc=41° C.,
3. distearoylphosphatidylcholine (DSPC) Tc=54° C., and
4. diarachidoylphosphatidylcholine (DAPC) Tc=66° C.

The above lipids may be purchased from Sigma (St. Louis, MO). Their purity may be verified by analytical thin layer chromatography on silica gel G using a developing solvent of chloroform/methanol/glacial acetic acid/water (90:40:12:2 v/v). The lipids are then dissolved in chlorohorm/methanol (2:1 v/v), aliquoted into glass tubes, dried under nitrogen at 40° C. and placed under high vacuum for 18–20 hours at 20° C. in order to remove residual chloroform before being stored under nitrogen at −25° C.

Small unilamellar liposomes (2) are prepared by sonication of a lipid suspension in aqueous buffer under an atmosphere of nitrogen. Typically, 5 milligrams of DPPC are sonicated in 0.5 milliliters of buffer which includes the fluorescent dye (4). The fluorescent dye (4) should either include a quenching agent or should have sufficient concentration to be self-quenching. During sonication, the temperature of the lipid suspension is maintained at least 5° C. above the lipid's transition temperature, e.g. 46° C. in the case of DPPC. The liposome (2) preparation is centrifuged (30 minutes at 100,000 g) to remove structures other than small liposomes (2), then cooled to at least 20° C. below the lipid transition temperature and separated from untrapped solutes by gel permeation chromatography using Bio-Rad P-10 gel (0.5×17 cm column) or the equivalent equilibrated with isotonic buffer. The liposomes (2) are eluted with the void volume while the untrapped dye and other solutes are retarded. Buffer osmolarity can be determined using a vapor pressure osmometer.

THE FLUORESCENT DYE

A preferred fluorescent dye (4) for use with the liposomal thermographic compositon is 5/6-carboxyfluorescein, using sodium as a counterion. 5/6-Carboxyfluorescein may be obtained from Eastman (Rochester, New York). Prior to use, the 5/6-carboxyfluorescein should be purified by recrystallization and hydrophobic adsorption chromatography on Sepharose LH20, as described by Ralston et al (Biochim. Biophys. Acta, vol. 649, pp 133–137 (1981)). Pure 5- and 6-carboxyfluorescein move with Rf's of 0.08 and 0.132 by thin layer chromatography on 500 micrometer thick silica gel G plates using a developing solvent composed of benzene/ethyl acetate/ligroin/acetic acid (100:14:10:1). 5/6-Carboxyfluorescein is an intensely fluorescent amphiphilic dye (4) which is used as a marker for the enclosed aqueous spaces of sealed liposomes (2). Weinstein et al. (Science, vol. 195, pp 489–492 (1977), incorporated herein by reference) demonstrated how this particular dye (4) can be trapped within the lumen (8) of sonicated phospholipid liposomes (2) at concentrations high enough to cause self-quenching, rendering the trapped material non-fluorescent. When dye (4) leaks out of the liposomes (2), it is diluted into the liquid medium (6), is no longer self-quenched, and assumes a brilliant green fluorescence. Thus, by monitoring the rate of increase in fluorescence intensity of the system, an accurate determination of the rate of dye (4) permeation can be made.

Figure 6:
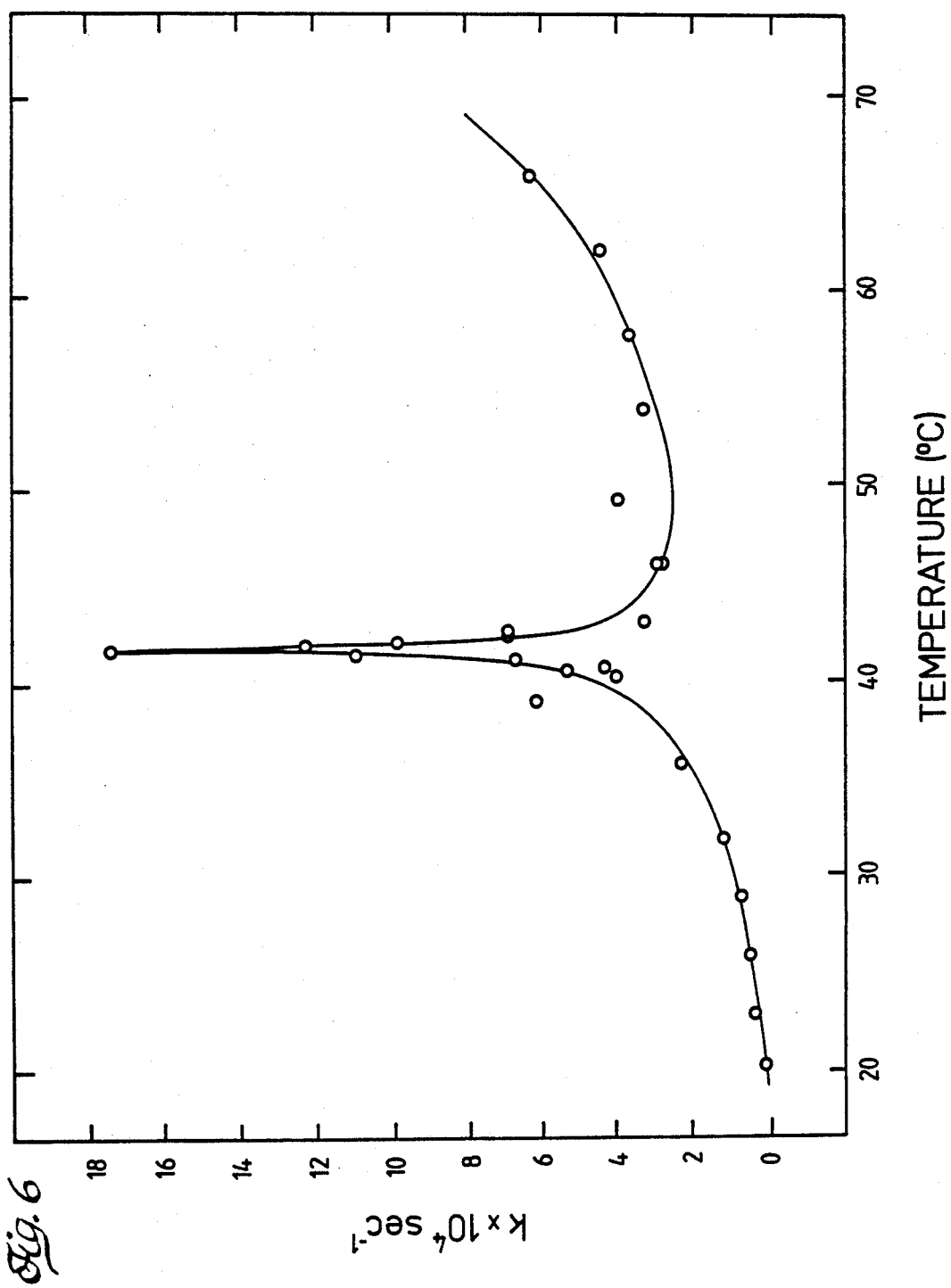
FIG. 6 is a graph showing the temerature dependence of dye permeation.

FIG. 6 shows the temperature dependence of dye permeation. The rate constant for permeation of 5/6-carboxyfluorescein across DPPC bilayers was determined over a range of temperatures using sodium as a counterion to the anionic dye. Unilamellar DPPC vesicles, containing 50 millimolar sodium 5/6-carboxyfluorescein (pH 7.4, 206 mOsm) and stored at 15° C. were suspended at zero time in 100 millimolar sodium pyrophosphate/citrate buffer (pH 7.0, 207 mOsm), equilibrated at defined temperatures in the sample compartent of a fluorescent spectrometer. Final lipid concentration was $10(-5)$ molar. The initial rate of fluorescence intensity increase (excitation and emission wavelengths 490 & 516 nanometers, respectively) was determined at each experimental temperature and is shown here in the form of a direct plot. The sharp maxium in the rate of ion leakage occurs at 41.4° C., coinciding with the temperature of the major gel-fluid phase transistion of DPPC (Tc).

FIG. 7 shows the profound influence of acyl chain composition upon the rate of sodium permeation. Phospholipid vesicles containing 50 millimolar sodium 5/6-carboxyfluorescein in 100 millimolar sodium pyrophosphate/citrate buffer (pH 7.0, 207 mOsm), equilibrated at defined temperatures. Final lipid concentration was approximately $10-5$ molar. Initial rates of dye leakage (monitored by increase in sample fluorescence intensity) were measured over a range of temperatures and with a variety of phopholipid compositions. The results are presented here in the form of Arrhenius functions plotted on a reduced temperature abscissa. Data for 5 different phospholipids is presented: DMPC (Tc=24° C.), DPPC (Tc=41° C.), DSPC (Tc=54° C.), DAPC (Tc=66° C.), DOPC (Tc=−25° C.). The upper abscissa shows a range of experimental temperatures coinciding with the reduced temperatures of the lower abscissa, permitting an easy comparison of the range of experimental temperatures used for each lipid. Note that zero on the lower abscissa corresponds to Tc for each lipid listed on the upper abscissa.

As shown in FIG.'s 6 and 7, the rate of permeation of 5/6-carboxyfluorescein across the membrane (10) of the liposomes (2) is highly temperature dependent. Although 5/6-carboxyfluorescein is the preferred fluorescent dye (4), other fluorescent dyes may also be employed. Best results have been found with amphiphilic fluorescent dyes having an anionic charge. For such fluorescent dyes, the rate of permeation across the memebrane of the liposome (2) has been found to depend upon the rate of permeation of the counterion. The use of sodium as a counterion is preferred because it has been found that its rate of permeation across the liposome (2) is highly temperature dependent. It is thought that such counterions pass through the membrane (10) at the interfaces of the gel and liquid-crystal phases of the lipid bilayer of the liposomes (2). The extent of these interfaces is maximized at the transition temperature.

The release of fluorescent dye (4) from the liposomes (2) after a freeze-thaw cycle depends only upon the freezing point of the liquid medium (6). If an aqueous buffer is employed as the liquid medium (6), this freezing point may be varied by the addition of an antifreeze, such as ethylene glycol, glcerol, or sucrose.

THE SACHET:

A liposomal thermograph is fabricated by loading a sachet (12) with the liposomal thermographic composition. In the preferred mode, the sachet (12) is hermetically sealed with the liposomal thermographic composition contained therein. A sachet (12) may be easily constructed from thin plastic tubing. One end of the tubing is clamped or sealed shut and the other end of the tubing is loaded with the liposomal thermographic composition. The open end is then clamped shut or sealed. If it is heat sealed, care must be taken not to activate the liposomal thermographic composition.

Liposomal thermographs may be made with multiple liposomal thermographic compositions, each having a different freezing point and/or transition temperature. If the same fluorescent dye (4) is employed for each of the different liposomal thermographic compositions, the different liposomal thermographic compositions should be put into separate enclosures within the sachet (12). However, if different fluorescent dyes are employed having different colors, it is possible to mix them into the same sachet (12).

The use of multiple liposomal thermographic compositions having different freezing points and transition temperatures allows the user to generate a more nearly complete thermal history for the goods being monitored.

In a preferred embodiment, the sachet (12) includes printed designations specifying the freezing point and/or transition temperature of the enclosed liposomal thermographic composition.

The completed liposomal thermograph is then stored at a temperature which is at the lower end of its operating range. The storage temperature should be above the freezing point of the liquid medium (6) and at least 20° C. below the transition temperature of the liposomes (2).

When used, the liposomal thermograph is taken out of storage and quickly placed in thermal contact with the goods which are to monitored. The observation of fluorescence is an indication that the goods have suffered a thermal transgression. A weak fluoresence indicates that the goods have been exposed to a slight elevation of temperature. A strong fluorescence indicates that either a freeze-thaw cycle has occured or that a prolonged or elevated temperature has occured. In order to distinguish between these two possibilities, a sachet (12) having multiple liposomal thermographic compositions having different freezing points and transition temperatures must be employed.

What is claimed is:

1. A liposomal thermograph comprising:
   a hermetically sealed sachet and
   a liposomal thermographic composition, said liposomal thermographic composition being bi-directional,
   said liposomal thermographic composition being contained within said sachet.

2. A liposomal thermograph as described in claim 1 wherein:
   said liposomal thermographic composition includes a liquid medium, liposomes, and a fluorescent dye,
   the fluorescent dye being contained by the liposomes and being quenched therein,
   the liquid medium being substantially free of the fluorescent dye,
   the liposomes being lysable upon exposure to a freeze-thaw cycle within the liquid medium and including a transition temperature above the freezing point of the liquid medium,
   the fluorescent dye being releasable from the liposomes upon lysis,
   the fluorescent dye being releasable from the liposomes through a temperature dependent rate of permeation, the temperature dependent rate of permeation being minimal slighly above the freezing point of the liquid medium and progressively increasing towards a maximum at the transition temperature of the liposomes,
   the fluorescent dye becoming unquenched and fluorescent upon release from the liposomes,
   whereby said liposomal thermographic composition becomes suddenly fluorescent upon exposure to a freeze-thaw cycle and becoming increasingly fluorescent over time when exposed to temperatures approaching the transition temperature.

3. A liposomal thermograph as described in claim 1 wherein:
   said sachet includes a printed designation specifying the transition temperature of the liposomes.

4. A liposomal thermograph as described in claim 1 wherein:
   said liquid medium includes an anti-freeze for depressing the freezing point of the liquid medium.

5. A liposomal thermograph comprising:
   a sachet having a first enclosure and a second enclosure,
   a first liposomal thermographic composition being bi-directional and having a first transition temperature, and
   a second liposomal thermographic composition being bi-directional and having a second transition temperature,
   the first transition temperature being different from the second transition temperature,
   said first liposomal thermographic composition contained within the first enclosure of said sachet,
   said second liposomal thermographic composition contained within the second enclosure of said sachet.

6. A liposomal thermographic as described in claim 5 wherein:
   said first liposomal thermographic composition including a first liquid medium having a first freezing point, said second liposomal thermographic composition including a second liquid medium having a second freezing point,
the first freezing point being different from the second freezing point.

7. A method for determining the thermal history of goods, the method comprising the following steps:
Step (A): placing and maintaining a liposomal thermograph in thermal contact with the goods, the liposomal thermograph being bi-directional, the liposomal thermograph becoming fluorescent when activated and remaining substantially non-fluorescent when unactivated, and then
Step (B): observing the fluorescence or non-fluorescence of the liposomal thermograph, and then
Step (C): correlating the observations of said step (B) with the thermal history of the goods.

8. A method for determining the thermal history of goods as described in claim 7 wherein:
in said Step (A), the liposomal thermograph becoming suddenly fluorescent upon exposure to a freeze-thaw cycle and becoming progressively fluorescent upon exposure to temperatures approaching a transition temperature.

9. A method for determining the thermal history of goods as described in claim 7 wherein:
In said Step (A), the liposomal thermograph including a first liposomal thermographic composition having a first transition temperature and a second liposomal thermographic composition having a second transition temperature, the first transition temperature being different from the second transition temperature, and
in said step (B), observing the fluorescence or non-fluorescence of the first liposomal thermographic composition and of the second liposomal thermographic composition.

10. A method for determining the thermal history of goods as described in claim 7 wherein:
In said Step (A), the liposomal thermograph including a first liposomal thermographic composition having a first freezing point and a second liposomal thermographic composition having a second freezing point, the first freezing point being different from the second freezing point temperature,
in said step (B), observing the fluorescence or non-fluorescence of the first liposomal thermographic composition and of the second liposomal thermographic composition.

11. A method for manufacturing a liposomal thermograph comprising the following steps:
Step (A): forming first liposomes, the first liposomes having a first transition temperature, while simultaneously or subsequently
Step (B): loading the first liposomes with a fluorescent dye, the fluorescent dye being quenched within the first liposomes, then
Step (C): washing the first liposomes for removing the fluorescent dye not contained within the first liposomes,
whereby only fluorescent dye confined to the first liposomes remains with the first liposomes,
Step (D): combining the first liposomes with a first liquid medium, the first liquid medium having a first freezing point,
the first liposomes then being bi-directionally activatable for releasing the fluorescent dye,
the first liposomes being maintained inactivated within the first liquid medium at a temperature slightly above the first freezing point for maintaining the first liquid medium in a condition which is substantially free of the fluorescent dye, the fluorescent dye becoming fluorescent if released from the liposomes and introduced into the first liquid medium, and then
Step (E): hermetically enclosing the first liposomes into a first enclosure of a sachet.

12. A method for manufacturing a liposomal thermograph as in claim 11 further comprising the following additional step:
in said step (B), the fluorescent dye being amphiphilic and having at least one charge at a first pH, while simultaneous to said step (B),
Step (B.1): loading the first liposomes with a first counterion having a charge opposite to the charge of the fluorescent dye at the first pH, the first counterion remaining substantially confined confined to the first liposomes at temperatures slightly above the first freezing point.

13. A method for manufacturing a liposomal thermograph as in claim 11 further comprising the following additional steps:
Step (F): forming second liposomes, the second liposomes having a second transition temperature, while simultaneously or subsequently
Step (G): loading the second liposomes with a fluorescent dye, the fluorescent dye being quenched within the second liposomes, then
Step (H): washing the second liposomes for removing the fluorescent dye not contained within the second liposomes,
whereby only fluorescent dye confined to the second liposomes remains with the second liposomes,
Step (I): combining the second liposomes with a second liquid medium, the second liquid medium having a second freezing point,
the second liposomes then being bi-directionally activatable for releasing the fluorescent dye,
the second liposomes being maintained inactivated within the second liquid medium at a temperature slightly above the second freezing point for maintaining the second liquid medium in a condition which is substantially free of the fluorescent dye, the fluorescent dye becoming fluorescent if released from the liposomes and introduced into the second liquid medium, and then
Step (J): hermetically enclosing the second liposomes into a second enclosure of a sachet.

14. A method for manufacturing a liposomal thermograph as in claim 11 further comprising the following additional steps:
Step (F): forming a second liposomes within a second liquid medium having a second pH and a second freezing point, the second liposomes having a second transition temperature within the second liquid medium, while simultaneously or subsequently
Step (G): loading the second liposomes with a second fluorescent dye, the fluorescent dye being confined to the lumen of the liposomes at a temperature below the transition temperature and above the freezing point of the second liquid medium, the fluorescent dye having at least one charge at the second pH, the fluorescent dye being amphiphilic, the fluorescent dye being self-quenchable, the fluorescent dye having a concentration within the lumen of the liposomes sufficient to be self-quenchable, while simultaneously, Step (H): loading the first liposomes with a counterion having a charge opposite to the charge of the fluorescent dye at the second pH, the counterion confined to the lumen of the liposomes at temperature below the transition temperature and above the freezing point, and then Step (I): enclosing the second liposomes into a second enclosure of the sachet.

* * * * *